United States Patent
Bar et al.

(10) Patent No.: US 11,916,361 B2
(45) Date of Patent: Feb. 27, 2024

(54) HAND-HELD CABLE MANIPULATION ACCESSORY

(71) Applicant: S.T.B.M.K. LTD, Holon (IL)

(72) Inventors: Yakov Bar, Kfar Saba (IL); Moshe Agami, Holon (IL); Itay Raz, Mazkeret Batia (IL)

(73) Assignee: S.T.B.M.K. LTD, Holon (IL)

( * ) Notice: Subject to any disclaimer, the term of this patent is extended or adjusted under 35 U.S.C. 154(b) by 0 days.

(21) Appl. No.: 18/159,381

(22) Filed: Jan. 25, 2023

(65) Prior Publication Data

US 2023/0361542 A1 Nov. 9, 2023

Related U.S. Application Data

(60) Provisional application No. 63/337,819, filed on May 3, 2022.

(51) Int. Cl.
*H02G 1/08* (2006.01)

(52) U.S. Cl.
CPC ............. *H02G 1/085* (2013.01); *H02G 1/081* (2013.01); *H02G 1/083* (2013.01)

(58) Field of Classification Search
CPC .......... H02G 1/08; H02G 1/083; H02G 1/081; H02G 1/085
See application file for complete search history.

(56) References Cited

U.S. PATENT DOCUMENTS

| 3,968,952 | A | * | 7/1976 | Newell | B66D 1/7447 254/338 |
| 4,454,999 | A | * | 6/1984 | Woodruff | B65H 49/24 242/397.2 |
| 5,755,029 | A | * | 5/1998 | Learned | F01L 1/024 29/888.011 |
| 7,216,848 | B2 | * | 5/2007 | Plummer | H02G 1/085 254/134.3 FT |
| 8,336,857 | B2 | * | 12/2012 | Davis | E03F 9/00 254/134.3 R |
| 2016/0261097 | A1 | * | 9/2016 | Smith | H02G 1/08 |
| 2022/0329053 | A1 | * | 10/2022 | Fiorentini | H02G 1/08 |

FOREIGN PATENT DOCUMENTS

| CN | 208874187 U | 5/2019 |
| CN | 110021895 A | 7/2019 |
| CN | 209097917 U | 7/2019 |
| CN | 209786652 U | 12/2019 |
| CN | 210182923 U | 3/2020 |
| CN | 111425160 A | 7/2020 |
| DE | 198 30 253 A1 | 1/2020 |
| KR | 2013-0005946 A | 1/2013 |
| WO | 2020261259 A1 | 12/2020 |

* cited by examiner

*Primary Examiner* — Lee D Wilson
(74) *Attorney, Agent, or Firm* — BROWDY AND NEIMARK, P.L.L.C.

(57) ABSTRACT

A threading accessory comprising a belt and two rotatable wheels configured to revolve the belt which has a circumferential groove formed in an outer face thereof and configured to receive and hold a portion of a thread therein. One or more press-wheels are used to engage a portion of the belt passing between the rotating wheels and elastically deform the belt portion to thereby at least partially wrap it about and latch the thread portion inside in the circumferential groove for propulsion by the belt.

20 Claims, 5 Drawing Sheets

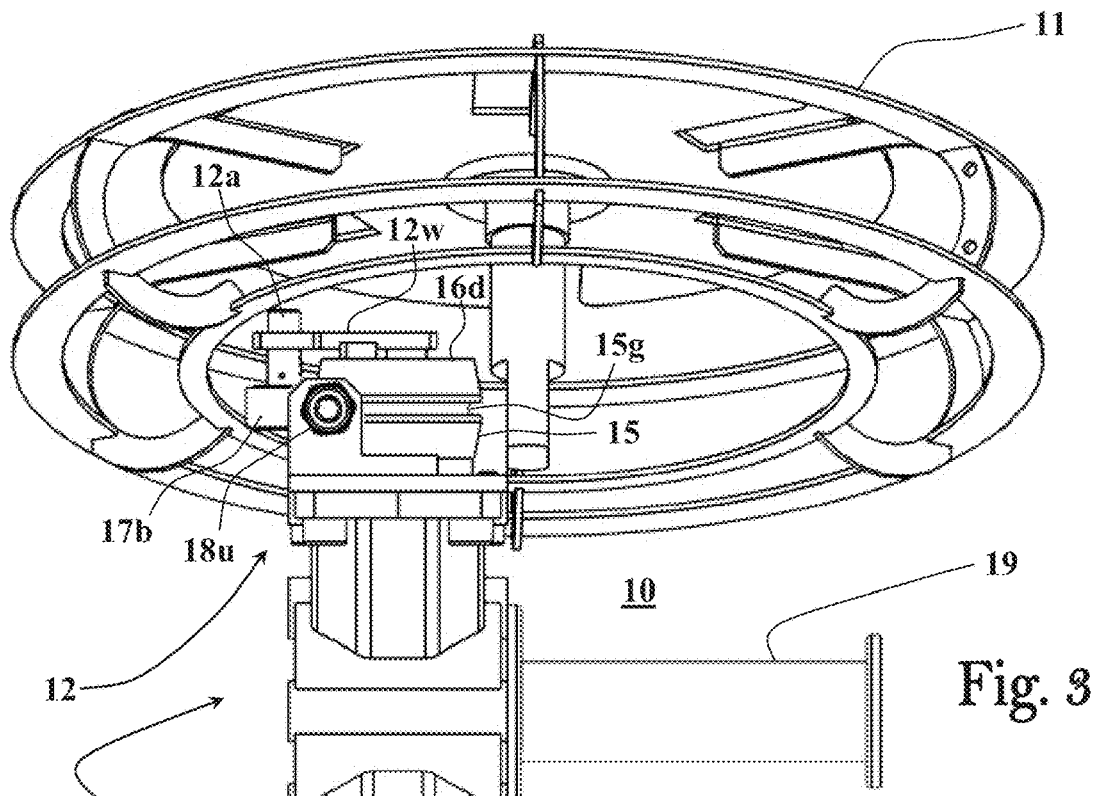
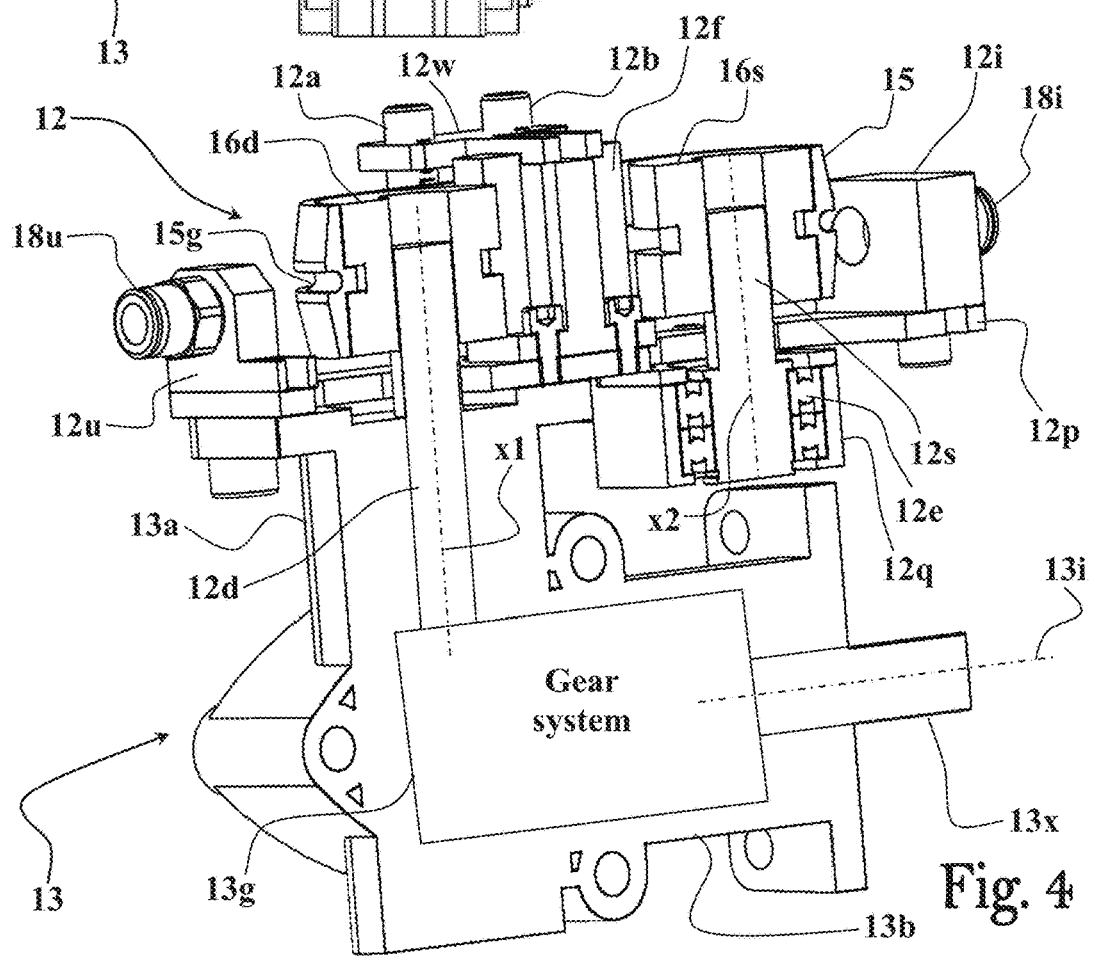

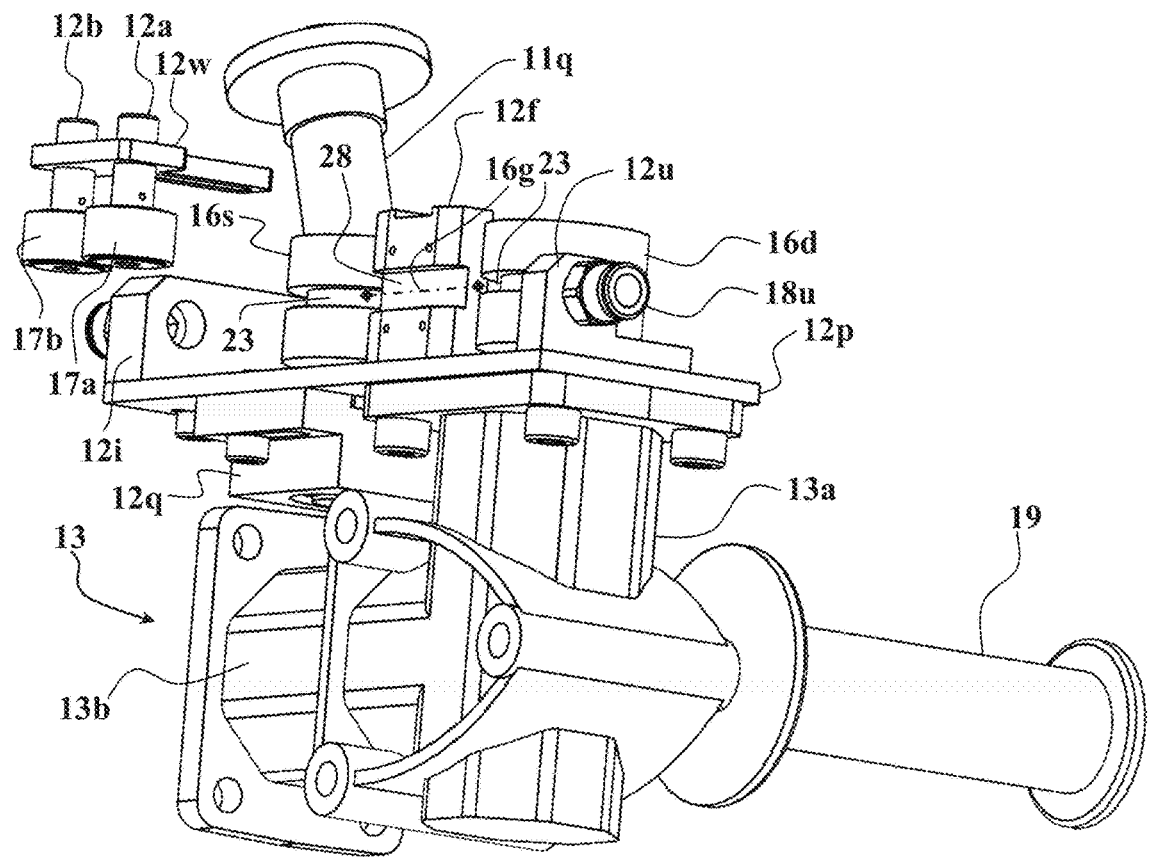
Fig. 5
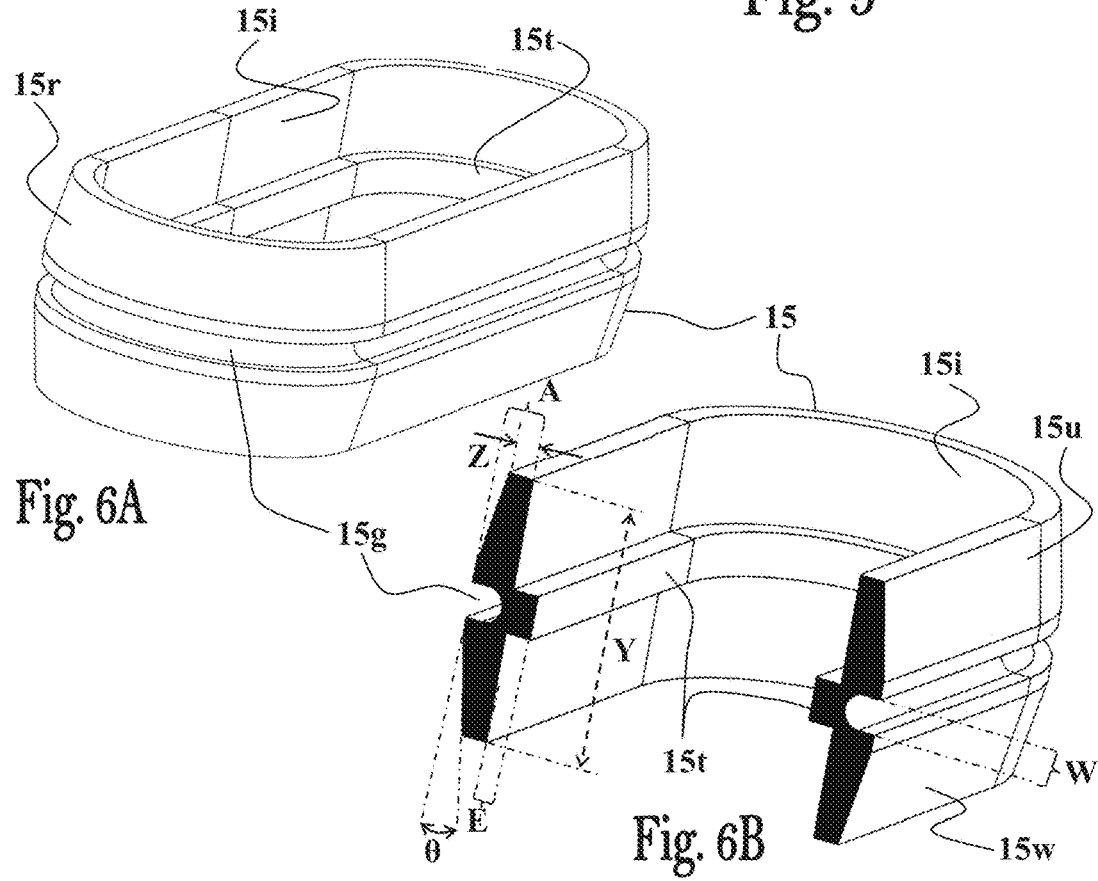
Fig. 6A
Fig. 6B

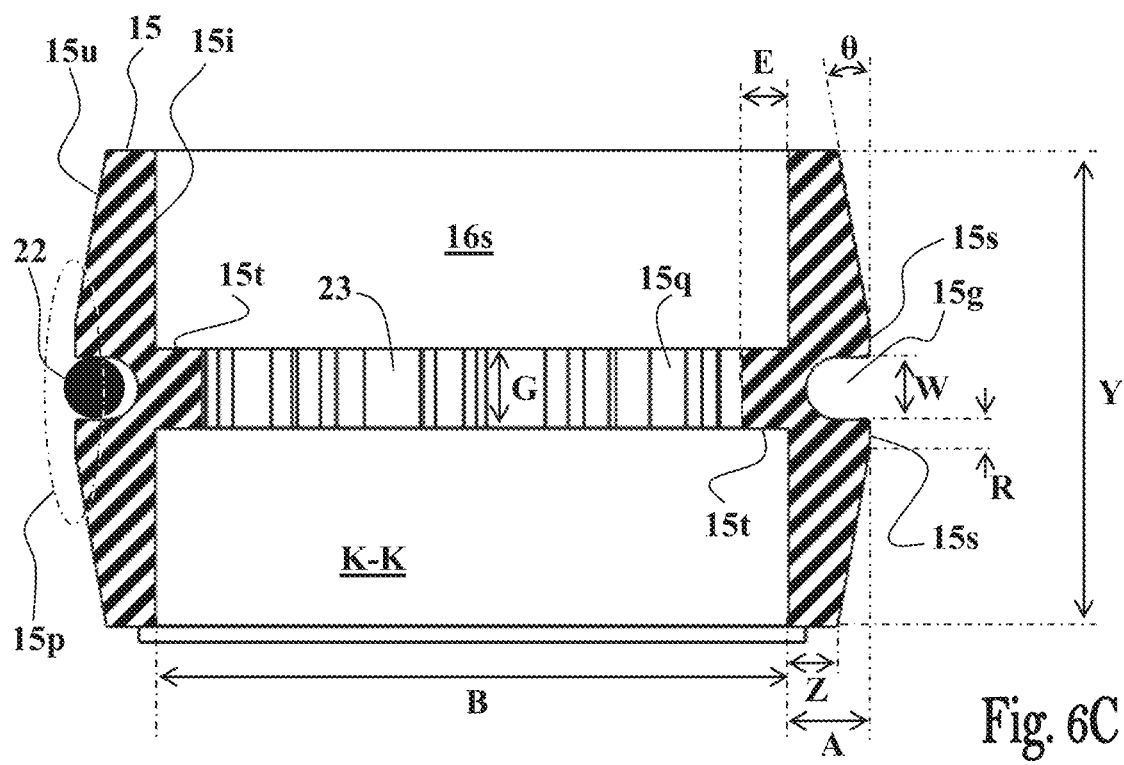
Fig. 6C
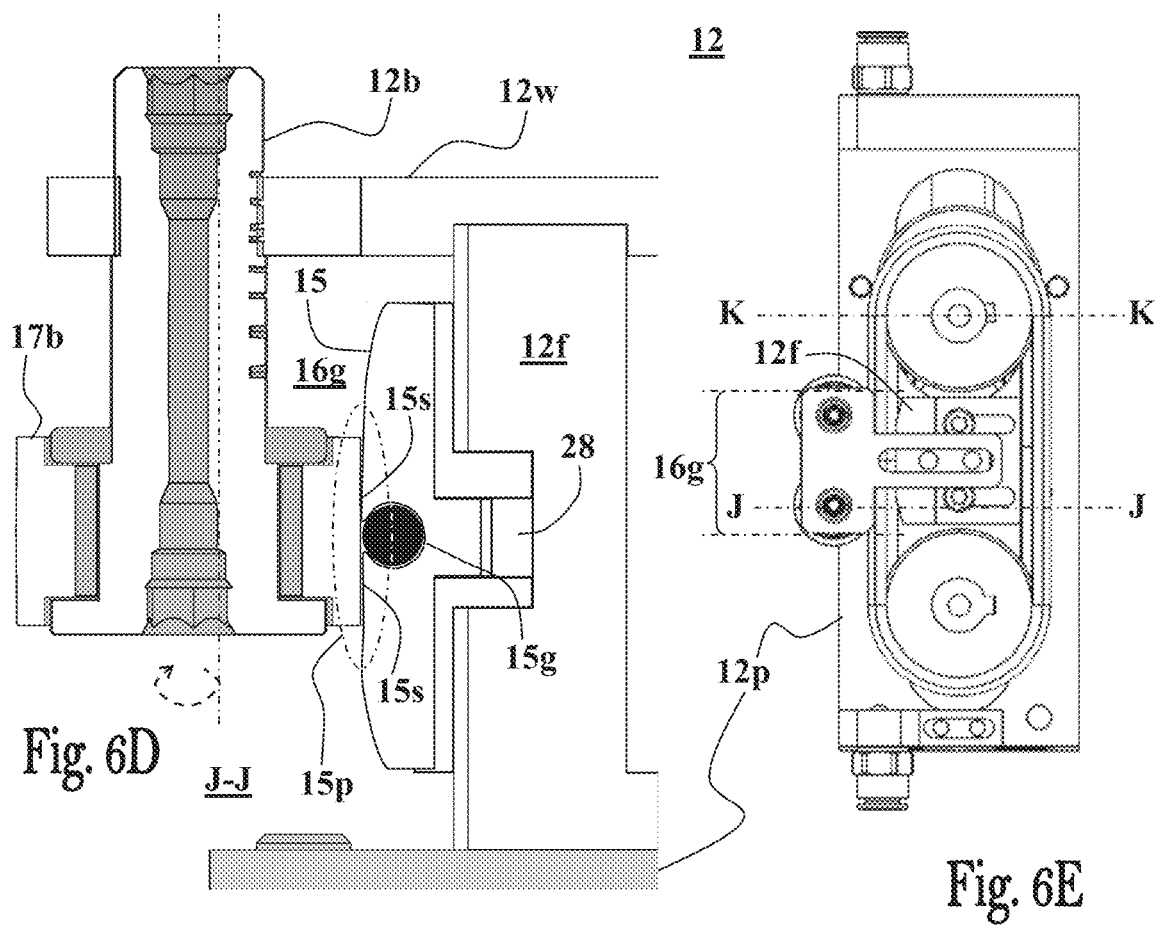
Fig. 6D
Fig. 6E

HAND-HELD CABLE MANIPULATION ACCESSORY

TECHNOLOGICAL FIELD

The disclosure generally relates to cable manipulation devices and method of using the same, and in particular to a hand-held cable manipulation accessory usable for threading a draw-tape through a wiring conduit.

BACKGROUND

This section intends to provide background information concerning the present application, which is not necessarily prior art.

A draw-tape (also known as a draw wire, fish-tape, stalband or electricians snake) is a tool typically used by electricians to route new wiring through walls and/or electrical conduits (metal or plastic pipes used for protecting electrical wiring). Generally, draw-tapes are made of a narrow band of a spring steel braid or fiberglass cable. By careful manipulation thereof, the draw-tape can be manipulated/threaded through confined spaces, such as wall cavities or conduits. The draw-tape is configured for pushing its extremity to traverse curved passages and turns towards a distal opening for installation of electrical cable/wire by pulling it back through e.g., using a guide string, to pull through various types of wiring, such as electricity cables/wires, telephone cables/wires, network cables, speaker wire, or suchlike.

Draw-tapes are usually coiled/spooled on a plastic/metal reel, and thus they typically have an inherent curvature that facilitates threading them through the electrical conduits. Therefore, by manipulating the reel, the end of the draw-tape can be directed slightly. The draw-tape is usually rigid enough, such that it can be pushed in the direction in which it is pointing. In this way it can be forcefully guided through an empty wall cavity and electrical conduits for installation of wires/cables thereinside.

In a typical wire/cable installation the end of the draw-tape is manually threaded through a proximal opening of the electrical conduit (e.g., located in an electrical cabinet, connection box, electric plug, lamp outlet, etc.), and the draw-tape is then manually pushed distally until its distal end emerges out of a distal opening of the electrical conduit. An electrical cable/wire can be then attached to the end of the draw-tape at the distal opening of the wiring conduit, and the draw-tape is then pulled back (i.e., proximally) thereby carrying the electrical cable therewith and installing it between the openings of the electrical conduit.

The conventional hand wire threading techniques are limited by mechanical complexity and may suffer from malfunctions. Manually pushing the draw-tape through the electrical conduit, and thereafter manually pulling it back therethrough with the electrical cable/wire attached to its distal end, can be difficult and exhausting task, particularly when there are turns/curves and/or long distances to be thereby traversed. Electricians are often required to install a plurality (tenths) of electrical cables/wires in building walls each day, which may become a painful burden and cause overuse tendon/muscle/ligament injuries.

Some cable/draw-tape threading solutions know from the patent literature are briefly described in the following paragraphs.

International Patent Publication No. WO 2020/261259 discloses method and device for driving a draw-tape. In some embodiments, a portion of the draw-tape is loaded into a driver device. Optionally, an actuator connected to the driver device moves the tape longitudinally with respect to the driver device. For example, a distal portion of the tape and/or a distal tip thereof is driven out from and/or into an exit opening of the driver device. Optionally by retaining exit opening of the driver device near an opening of a conduit, the driver drives the distal tip of the tape into or out of the conduit. In some embodiment the tape is driven by a friction wheel. In some embodiment, power is supplied by a power tool (e.g., a power screwdriver) that is reversibly attached to the driver.

Chinese Patent publication No. CN110021895 discloses a threading machine comprising a machine body and a driver, wherein the machine body is internally provided with a transmission component; the driver is in transmission connection with the transmission component; the upper end of the machine body is provided with a threading guiding component; the threading guiding component comprises a left synchronous belt and a right synchronous belt; a left driving pulley and a right driving pulley arranged longitudinally on two sides of the upper end of the machine body respectively; a left driven pulley is arranged on the right side of the left driving pulley at the upper end of the machine body, and a right driven pulley is arranged on the rear side of the right driving pulley at the upper end of the machine body; the synchronous belt is arranged outside the left driving pulley and the left driven pulley; the right synchronous belt is arranged outside the right driving pulley and the right driven pulley; and a gap between the left synchronous belt and the right synchronous belt serves as a threading gap. According to the threading machine, the synchronism of a traction threading lead is high, synchronous traction of a cable is carried out through mutual clamping of the left synchronous belt and the right synchronous belt, in the transmission process, power needs to be output to the left driving pulley and the right driving pulley, and the left driven pulley, the right driven pulley, an additional left intermediate pulley and an additional right intermediate pulley are driven by the synchronous belts.

Chinese Utility Model Publication No. CN209786652 discloses a threading machine comprising two sets of oppositely-arranged driving belt wheels, two sets of oppositely-arranged driven belt wheels and a synchronous belt. The two driving belt wheels are arranged on the right side of the upper end of the machine body, the two driven belt wheels are arranged on the left side of the upper end of the machine body, and synchronous belts are arranged between the rear driving belt wheel and the rear driven belt wheel and between the front driving belt wheel and the front driven belt wheel in a sleeved mode respectively. Two driven spindles are arranged on the left side in the machine body, two transmission spindles are arranged on the right side in the machine body, and a lead groove tightness adjusting assembly used for adjusting the distance between the driven spindles is arranged in the machine body. The synchronous traction device has the advantages that the synchronism of traction threading leads is good, synchronous traction of cables is carried out through mutual clamping of the front side synchronous belt and the rear side synchronous belt, and in the transmission process, the synchronous belts on the two sides can be driven to synchronously act only by outputting power to the single side driving belt wheel.

Chinese Utility Model Publication No. CN208874187 discloses a steel wire traction device in which a steel wire penetrates through a building or structure wire pipe and a staggered distribution wheel set of the steel wire traction wire is used. The device is characterized in that a driving wheel set of the wedge-shaped grooved wheel and a driven wheel set of the pulley are longitudinally arranged in a straight line and are transversely distributed in a staggered manner. The power mechanism, the speed reducing mechanism and the driving wheel set are sequentially connected, the driven wheel set is connected with the pressure adjusting mechanism, the steel wire is longitudinally placed in the staggered gap, the pressure adjusting mechanism is adjusted to enable the driven wheel set to transversely slide relative to the driving wheel set, and therefore elastic deformation of the steel wire is adjusted. The power mechanism can adopt a handheld electric drill. According to the device, the stress area of the steel wire is increased through elastic deformation of the steel wire, and enough friction force is generated on the wedge-shaped grooved wheel to convey the steel wire. In practical application, abrasion of the wheel set and the steel wire is small, and compared with the prior art, the conveying and traction capacity of the steel wire is improved by multiple times. The invention further provides a double-steel-wire traction device of the staggered distribution wheel set, and the double-steel-wire traction device can convey or pull two steel wires at the same time.

GENERAL DESCRIPTION

There is a need in the art for simplified hand-held cable/wire threading devices connectable to/actuatable by a selected hand-held actuator for manipulating (i.e., pushing and/or pulling) a cable/wire in a selected medium. Such medium can, for example, be a wall, an electrical conduit, concealed or non-concealed cable/wiring tunnels e.g., mounted inside or outside building walls, city street underground cable/wiring passageways, or suchlike. Cable/wire threading devices known heretofore from the patent literature are mechanically complex, difficult to operate and expensive to manufacture.

Embodiments disclosed herein provide hand-held cable/wire threading accessory configured for actuation by a hand-held actuator (e.g., electric driller or screwdriver) usable for effectively and controllably threading/manipulating (pushing/pulling) a draw-tape. It should be however clear that the disclosed embodiments are not limited for implementation as a handheld appliance/accessory, and that the same principles and features thereof can be similarly used to implement stationary (or wheeled/maneuverable) threading devices that can be actuated by any suitable integrally mounted or reversibly connectable actuator (e.g., electric, combustion or pneumatic engine).

It is also noted that the embodiments disclosed herein are not limited to the threading of a draw-tape (e.g., made of stainless steel or fiberglass) through an electrical conduit, nor to the installation of wire/cables. In fact, the disclosed embodiments can be used for threading any type of cable/wire or pipe/conduit having sufficient rigidity to be pushed or pulled longitudinally to traverse any type of concealed (or non-concealed) passageway, for any desired purpose such as, but not limited to, installation of elastically (or flexibly) deformable wire/cable or (e.g., pneumatic) pipe/conduit or fiber optic cable, monitoring and/or removing of blockages/clogs (e.g., in building walls, cable/wiring tunnels or sewer/drainage pipes/passageways), distance measurements of such passageways, etc. The embodiments disclosed herein are thus generally referred to herein as a threading accessory, and the wire, cable, draw-tape or pipe/conduit thereby manipulated is generally referred to herein as a propellable thread or thread.

Embodiments of the threading accessory includes a propulsion unit configured to apply backward or forward (push/pull) movement to portions of the propellable thread, which can be spooled inside a thread/draw-tape container connectable to the propulsion unit. In possible embodiments a transmission unit is used for mechanically coupling between the propulsion unit and the handheld actuator. The thread/draw-tape container can be rotated in one direction when portions of the propellable thread are propelled therefrom, or rotated in an opposite direction when portions of the propellable thread are propelled into the thread/draw-tape container and spooled thereinside.

The propulsion unit utilizes in some embodiments two rotating wheels and a grooved belt (having a medial circumferential groove) coupled to (mounted and/or stretched over) the rotating wheels to transfer the rotary motion of the handheld actuator (e.g., received via the transmission unit) to the rotating wheels and to the grooved propulsion belt coupled thereto. In some embodiments, the grooved belt has an inner engagement side for mechanically coupling to the rotating wheels, and an outer propulsion side having the circumferential groove configured to receive and firmly retain a portion of the propellable thread thereinside.

Optionally, but in some embodiments preferably, the propulsion unit is configured to form a belt pressing gap defined between the rotating wheels. The belt pressing gap is configured for pressing a portion of the grooved belt to elastically deform it over the propellable thread and thereby substantially enhance the friction and retention forces thereby applied over the propellable thread. One or more rollers (e.g., cam followers) can be used in the belt pressing gap of the propulsion unit to press a portion of the propellable thread for retention in the grooved propulsion belt. More specifically, the one or more rollers are adapted to press a portion of the propellable thread passing through the belt pressing gap of the propulsion unit into a portion of the circumferential groove of the grooved propulsion belt, and cause deformation of the grooved propulsion belt thereby pressed over the propellable thread portion, thereby firmly holding and propelling the propellable thread portion due to the enhanced friction/retention forces obtained therebetween.

Accordingly, embodiments of the present application are directed to a threading accessory comprising a propulsion unit configured to manipulate portions of a propellable thread passing therethrough. The propulsion unit comprising a propulsion belt coupled to/stretched between two rotating wheels, where the propulsion belt having a circumferential groove configured to receive and hold the portions of the propellable thread, and a deformable region defined therein about the circumferential groove. A belt pressing zone can be defined between the rotating wheels and configured for elastically deforming the deformable region therein for causing it to wrap about substantial circumference portion of the propellable thread, to thereby enhance friction/retention forces between the portions of the propellable thread held inside the circumferential groove. The threading accessory can also comprise a transmission unit configured to receive external rotary motion and transfer it to the propulsion unit for actuating at least one of the rotating wheels.

One or more rollers can be used in the belt pressing zone configured to apply pressure/force for elastically deforming the deformable region of the propulsion belt. Optionally, the threading device comprises a tiltable thread/draw-tape container configured to assume an adjustable tilt angle responsive to propulsions (pushing or pulling) of the portions of the propellable thread.

A method of threading a propellable thread by the threading accessory may comprise coupling an actuator to a transmission unit of the threading accessory, activating the actuator to transfer rotary motion in a first rotary direction to the transmission unit, thereby rotating the propulsion belt of the propulsion unit. The circumferential groove of the propulsion belt is configured to receive and hold portions of the propellable thread, and cause a deformable region of the propulsion belt to elastically deform and wrap about substantial circumference portion of the propellable thread, to thereby enhance friction/retention forces between portions of the propellable thread held inside the circumferential groove of the propulsion belt. This way the propellable thread can be pushed in a first axial direction from the propulsion unit.

The method can further comprise activating the actuator to transfer rotary motion in a second rotary direction i.e., opposite to the first rotary direction, to the transmission unit, to thereby rotate the propulsion belt of the propulsion unit to pull the propellable thread in a second axial direction i.e., opposite to the first axial direction, into the propulsion unit for spooling inside the thread/draw-tape container.

Optionally, but in some embodiments preferably, the threading accessory is configured to be carried by the external actuator device attached to its transmission unit. This way, the threading accessory can be carried/maneuvered and/or operated using only the external actuator device, without contacting the threading accessory by the operator's hands during operation.

In one aspect there is provided a threading accessory comprising a belt and two rotatable wheels configured to revolve the belt. The belt comprises a circumferential groove formed in an outer face thereof and configured to receive and hold a portion of a thread therein. The threading accessory comprises one or more press-wheels configured to engage a portion of the belt passing between the rotating wheels and elastically deform the belt portion to thereby at least partially deform and/or wrap it about the thread portion and latch the thread portion inside in the circumferential groove.

The threading accessory comprises in some embodiments a press-wall fixedly located between the rotating wheels facing an inner face of the belt. The one or more press-wheels can be configured to press the portion of the belt thereby engaged against the press-wall for elastically deforming the belt portion. The press-wall comprises in possible embodiments a horizontal groove configured to receive portions of the belt pressed by the one or more press-wheels and facilitate the elastic deformation of the belt portion and its latch over the thread. Optionally, but in some embodiments preferably, the one or more press-wheels are fixedly connected to the press-wall.

In some embodiments the threading accessory comprises at least one guiding eyelet configured to guide the thread to, or from, the circumferential groove of the belt. The belt may comprise a circumferential driving rail formed on an inner side thereof. The rotatable wheels may comprise a retention groove configured to receive the driving rail of the belt thereinside. Optionally, the circumferential driving rail of at least one of the rotatable wheels has a cogged inner surface. The circumferential driving rail of the belt may comprise corresponding cogs configured to mate with the cogged inner surface of the circumferential driving rail of the at least one of the rotatable wheels.

The belt, the rotatable wheels and the press-wheels, are in possible embodiments arranged on one side of a support platform. A transmission unit of the threading accessory can be attached to another side of the support platform and mechanically coupled to at least one of the rotatable wheels therethrough. The transmission unit comprises in some embodiments a gear system configured to receive external rotary motion over an axis of rotations substantially parallel to a threading axis of the threading device, and transfer the rotary motion to at least one of the rotatable wheels.

The threading accessory may comprise a handle e.g., connectable to the transmission unit. The belt comprises in some embodiments tapering sections extending from the circumferential groove towards the edges of the belt and configured to facilitate the deformation and latch thereof over the thread held in its circumferential groove.

Optionally, at least one of the rotatable wheels comprises cogs. The inner face of the belt may comprise corresponding cogs configured to mate with the cogs of at least one of the rotatable wheels.

The threading accessory comprises in some embodiments a tiltable thread container configured to spool the thread thereinside against inner elements thereof. The tiltable thread container can be attached to the threading accessory by an axle. The tiltable thread container is configured to rotate about the axle in opposite directions in response the spooling of the thread thereinside and to the unspooling of the thread. The tiltable thread container can be a circular container having a circular opening configured for passage of the thread therethrough.

In another aspect there is provided a method of threading a thread. The method comprising coupling an actuator to a transmission unit of a threading accessory, activating the actuator to transfer rotary motion in a first rotary direction for rotating a propulsion belt of the threading accessory, the propulsion belt having a propellable thread held in a circumferential groove thereof, pressing a portion of the propulsion belt and causing it to elastically deform and at least partially wrap over the propellable thread, to thereby enhance friction/retention forces between portions of the propellable thread and the circumferential groove of the propulsion belt as the propellable thread is moved in a first axial direction with respect to said propulsion unit.

The method comprises in some embodiments activating the actuator to transfer the rotary motion in a second rotary direction, being opposite to the first rotary direction, thereby causing the propulsion belt to move the propellable thread in a second axial direction with respect to the propulsion unit. The method can further comprise spooling or unspooling portions of the propellable thread inside a rotatable thread container responsive to the activating of the actuator.

BRIEF DESCRIPTION OF THE DRAWINGS

In order to better understand the subject matter disclosed herein and to exemplify how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 1 to 3 schematically illustrate a hand-held threading accessory according to some possible embodiments, wherein FIG. 1 shows a perspective side view of the hand-held threading accessory, FIG. 2 shows a side view of the hand-held threading accessory in its operative state (with the propellable thread) and an actuator device connectable thereto, and FIG. 3 shows a front view of the hand-held threading accessory;

FIGS. 4 and 5 show schematic illustrations of the hand-held threading accessory without the thread/draw-tape container, wherein FIG. 4 shows a sectional perspective front view of the hand-held threading accessory and FIG. 5 shows a partially exploded perspective view of the hand-held threading accessory;

FIGS. 6A to 6E schematically illustrate a grooved belt and an operational state thereof in a propulsion unit utilizing it according to some possible embodiments, wherein FIGS. 6A and 6B respectively show perspective and sectional-perspective views of the grooved belt, FIG. 6C shows a sectional view taken at the rear rotating wheel of the propulsion unit, FIG. 6D shows a sectional view taken at the belt pressing gap of the propulsion unit, and FIG. 6E shows a top view of the propulsion unit with the grooved band/belt coupled to its rotating wheels;

DETAILED DESCRIPTION OF EMBODIMENTS

Figure 1:
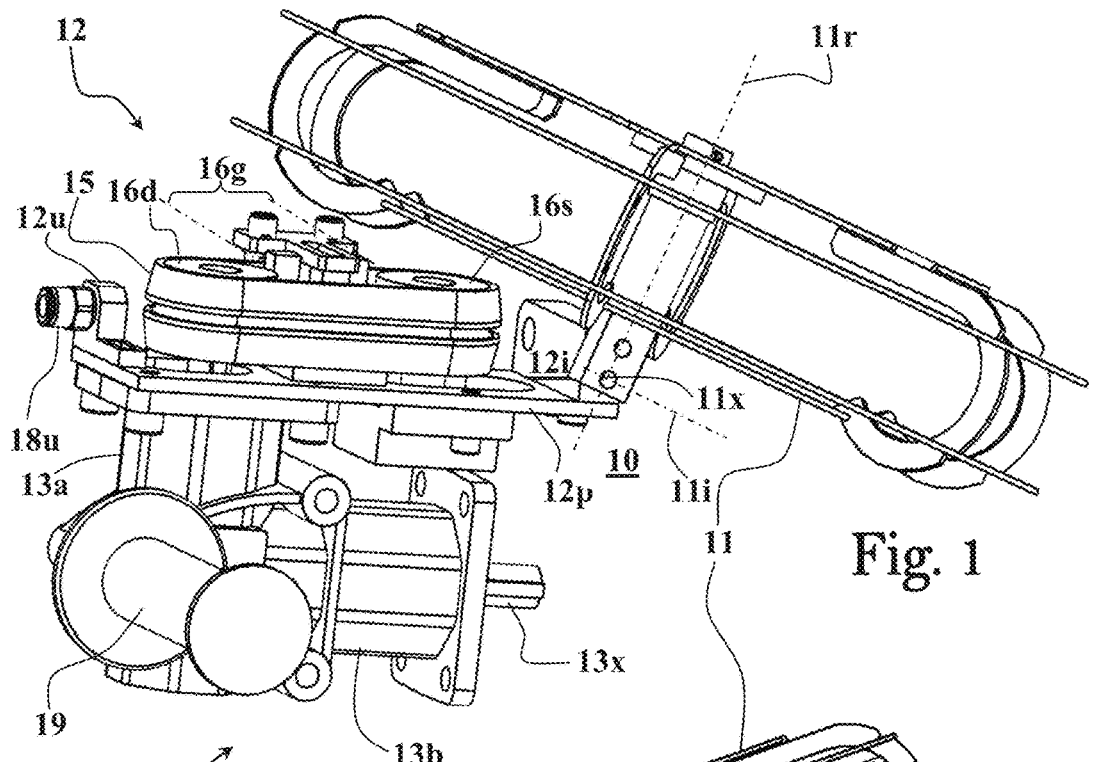

The various embodiments of the present application are described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, or in correct proportional relationships, which are not critical. Emphasis instead being placed upon clearly illustrating the principles of the invention to allow persons skilled in the art to make and use it, once they understand its principles.

The embodiments disclosed hereinbelow are directed to a threading accessory for advancing/retracting a propellable thread through concealed or non-concealed passageways e.g., conduits or tunnels, for installation of cable/wire/conduit thereinside. The threading accessory generally comprises a tiltable thread/draw-tape container having in some embodiments the propellable thread spooled thereinside, a transmission unit configured to receive rotary motion generated by an external actuator device about a rotational motion axis thereof, and a propulsion unit connected to a transmission arm of the transmission unit, said transmission arm being substantially perpendicular to the rotational motion axis of the transmission unit.

The propulsion unit is configured to receive rotary motion from the transmission for propelling portions of the propellable thread from/to the thread/draw-tape container in a propulsion plane that is substantially parallel to the rotational motion axis of the transmission unit. Optionally, but in some embodiments preferably, the rotational motion axis of the transmission unit and the propellable thread passing through the propulsion unit extend along substantially parallel imaginary lines.

In some embodiments the thread/draw-tape container is hinged to a rear side portion of the propulsion unit for adjustably adapting a tilt angle thereof with respect to the propulsion plane defined by the propulsion unit as portions of the propellable thread are propelled therefrom or thereinto. This way, the thread/draw-tape container can assume a certain tilt angle as it is rotated in a first direction about its spool axis while portions of the propellable thread are propelled therefrom by the propulsion unit, a different tilt angle as it is rotated in a second (opposite) direction about its spool axis while portions of the propellable thread are propelled thereinto, and its tilt angle may progressively change as increasing portions of the propellable thread are accumulated inside the thread/draw-tape container, or ejected therefrom. The adjustable tile angle configuration of the thread/draw-tape container minimizes the loads thereby imparted over the propulsion unit.

In some embodiments the propulsion unit comprises two rotating wheels, at least one of which is mechanically coupled to receive rotary motion from the transmission unit, and a grooved band/belt coupled to/mounted over the rotating wheels arranged thereon to define a thread-retaining side and thread-free side of the propulsion unit. The grooved band/belt comprises a (e.g., medial) circumferential groove configured to receive and hold a portion of the propellable thread in the thread-retaining side of propulsion unit. In this way, the rotary motion transferred from the transmission unit to the propulsion unit rotates at least one of the rotating wheels, which thus also rotates the grooved band/belt, thereby propelling a portion of the propellable thread retained inside the circumferential groove at the thread-retaining side of the propulsion unit into, or out of, the thread/draw-tape container, which responsively rotates the thread/draw-tape container about its spool axis.

In some embodiments the rotating wheels of the propulsion unit are configured to define therebetween a belt pressing zone of the thread-retaining side of the propulsion unit. The belt pressing zone is configured for elastically deforming a portion of the grooved band/belt so as to substantially wrap it over a substantial circumference portion of the propellable thread portion thereby held with enhanced pressure thereover, to thereby increase the friction and retention forces of the grooved band/belt over the propellable thread and enhance its grip thereover. One or more rollers are mounted in some embodiments in the belt pressing zone for pressing the propellable thread into a portion of the circumferential groove of the grooved band/belt, and elastically deforming a respective portion of the grooved band/belt to wrap it about the circumference of the propellable thread thereby gripped.

In some embodiments the grooved band/belt is a synchronous (timing) belt and the rotating wheels are cogwheels configured to mate therewith. Optionally, but in some embodiments preferably, the grooved band/belt comprises a medial driving rail formed on its inner side. Each of the rotating wheels of the propulsion unit can accordingly comprise a circumferential channel configured to receive and hold portions of the driving rail of the grooved band/belt as it is thereby rotated. In some embodiments only the medial driving rail of the grooved band/belt is configured with synchronous/timing cogs configured to mate with respective toothed/cogged (or sprockets) surface formed inside the circumferential channel of the rotating wheels.

For an overview of several example features, process stages, and principles of the invention, the examples of draw-tape threading are illustrated schematically and diagrammatically and described hereinbelow. Such draw-tape threading applications are shown as one example implementation that demonstrates a number of features, processes, and principles usable for installation of electric wires/cables in an electric conduit/tunnel, but they are also useful for other applications and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in threading applications may be suitably employed, and are intended to fall within the scope of this disclosure.

Figure 2:
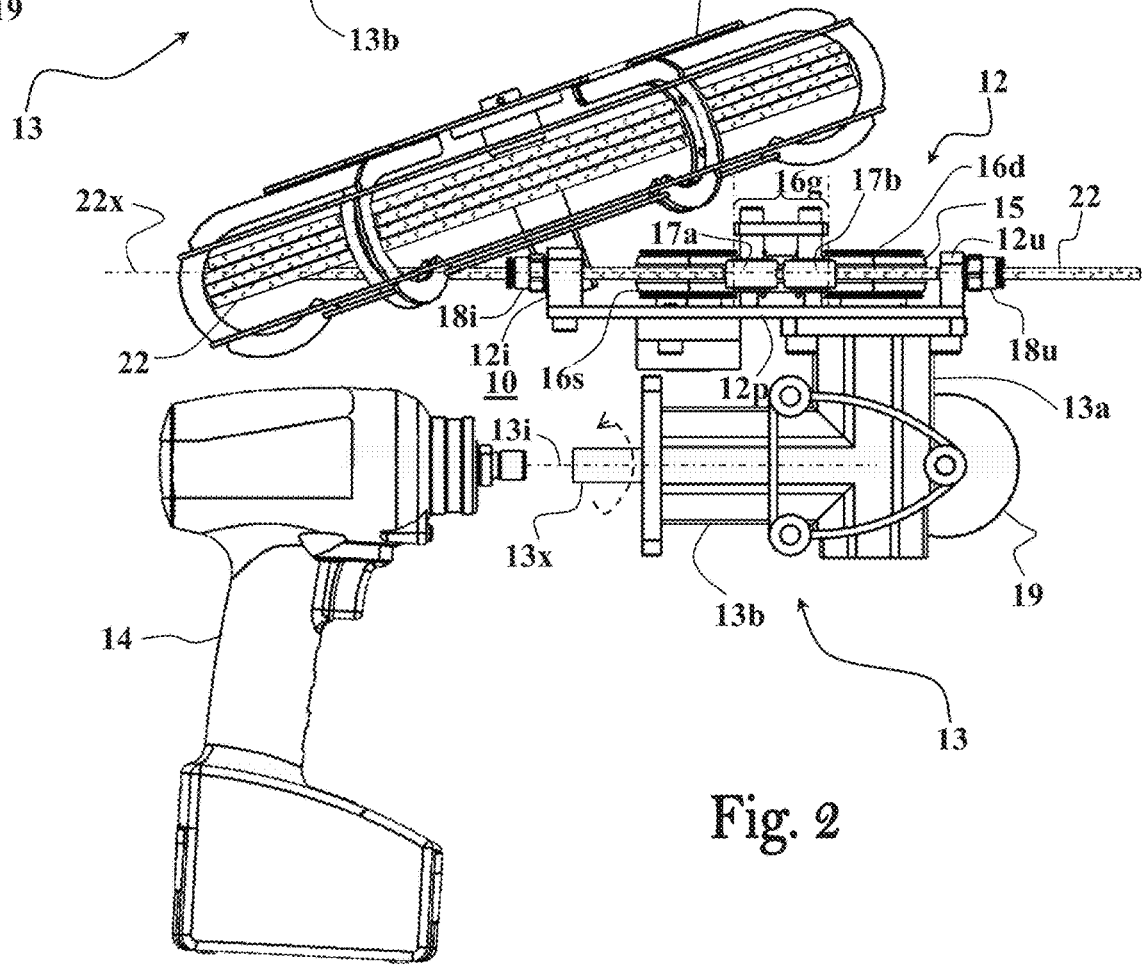

Reference is made to FIGS. 1 to 3, schematically illustrating a hand-held threading accessory 10 according to some possible embodiments. FIGS. 1 and 2 show the hand-held threading accessory 10 in its inoperative state (without a draw-tape 22), and in its operative (with the draw-tape 22) state, respectively. FIG. 3 shows a front view of the hand-held threading accessory 10. The threading accessory 10 is configured in some embodiments to be actuated by/connectable to a hand-held actuator device 14 for driving/manipulating (i.e., pushing and/or pulling) the draw-tape 22. The draw-tape 22 can, for example, be supplied as an elongated cable made of fiberglass, or braided still or stainless still.

The threading accessory 10 generally includes a transmission unit 13 configured to receive rotary motion from the actuator device 14, a tiltable thread container 11 comprising in some embodiments a draw-tape 22 spooled thereinside, and a propulsion unit 12 configured to receive rotary motion from the transmission unit 13 for propelling portions of the draw-tape 22 outwardly from the thread container 11, or inwardly thereinto. The thread container 11 is pivotally coupled to a support platform 12p of the propulsion unit 12. Particularly, the thread container 11 can be rotatably coupled to a rear support 12i protruding upwardly from a rear edge of the support platform 12p e.g., by a pivot/hinge 11x for allowing angular movement of the tiltable thread container 11 about a tilt axis 11i thereof. The tiltable thread container 11 forms a circular housing configured to accommodate the draw-tape 22 such that the draw-tape 22 is spooled/constrained thereinside.

The thread container 11 is configured to rotate about a spool axis 11r thereof in one direction responsive to the outward propulsion (pull-out) of the draw-tape 22 therefrom by the propulsion unit 12, and in an opposite direction responsive to the inward propulsion (pull-in) of the draw-tape 22 thereinto by the propulsion unit 12. This allows for releasing/distally pushing portions of the draw-tape 22 being spooled inside the thread container 11, or proximally pulling portions of the draw-tape 22 for spooling it inside the thread container 11.

Components of the propulsion unit 12 are coupled to the support platform 12p on its top and/or bottom surfaces. The transmission unit 13 comprises a transmission arm 13a configured to transfer rotary motion from the transmission unit 13 to the propulsion unit 12, thereby mechanically coupling between the propulsion unit 12 and the handheld actuator device 14. Optionally, but in some embodiments preferably, the transmission arm 13a perpendicularly extends from the transmission unit 13, and it can be perpendicularly coupled to the support platform 12p at its bottom surface.

As seen in FIGS. 1 and 2, the transmission unit 13 comprises a receiving axle/shaft 13x arranged along a rotational motion axis 13i thereof, such that a portion thereof projects outwardly from the transmission unit 13. The receiving axle/shaft 13x is configured for coupling between the transmission unit 13 and the handheld actuator 14, and for receiving rotary motion therefrom, which is then relayed by the transmission unit 13 to the propulsion unit 12 for pushing/pulling the draw-tape 22. In some embodiments, the receiving axle/shaft 13x is rotatable in two opposite directions, i.e., clockwise, and counterclockwise in accordance with typical operation states of the handheld actuator 14. Optionally, the receiving axle/shaft 13x is connected to the handheld actuator 14 by coupling, but is some embodiments it is directly connected to the handheld actuator 14 e.g., using an adjustable drill head/chunk.

Optionally, but in some embodiments preferably, the threading accessory 10 is provided with a handle 19 fixedly/removably connected to the main body 13b of the transmission unit 13 to laterally extend therefrom.

The propulsion unit 12 includes two spaced-apart rotating wheels, a front driving wheel 16d and a rear driven wheel 16s, and a grooved propulsion belt 15 stretched between the wheels, 16s and 16d. The propulsion unit 12, namely its driving wheel 16d, is actuated by rotary motion transferred thereto via the transmission arm 13a of the transmission unit 13. In this specific and non-limiting example, the front/driving wheel 16d is mechanically coupled to the transmission unit 13 via a transmission shaft/axle (12d in FIG. 4) configured for transferring/relaying rotary motion received from the actuator 14 to the driving wheel 16d. Alternatively, or additionally, the transmission unit 13 can be similarly coupled to the rear wheel 16s for thereby rotating it.

Accordingly, the illustrated embodiments the front driving wheel 16d is configured to transfer the rotary motion of the handheld actuator 14 received via the transmission unit 13 to the grooved propulsion belt 15, which, in turn, transfers the rotary motion to the rear driven wheel 16d and causes rotation thereof. The grooved propulsion belt 15 has an inner engagement side (15i in FIGS. 6A and 6B) for mechanically coupling to the spaced-apart rotating wheels 16s and 16d, and a grooved outer/retaining side (15t) having a medial circumferential groove 15g (i.e., extending along a circumference of the belt 15 in the axial direction). The grooved outer/retaining side (15r) of the grooved propulsion belt 15 is configured to receive and retain portion of the draw-tap 22 inside a respective portion of the circumferential groove (15g) thereof.

As best seen in FIG. 2, the support platform 12p can be implemented by a flat plate arranged to (e.g., perpendicularly) connect to the transmission arm 13a of the transmission unit 13. The support platform 12p extends backwardly from the end side coupled to the transmission arm 13a e.g., substantially parallel to a threading axis 22x of the hand-held threading accessory 10. The Optionally, but in some embodiments preferably, the rotational motion axis 13i of the transmission unit 13 is substantially parallel to the threading axis 22x.

The rotating wheels 16s and 16d, and the grooved propulsion band/belt 15 mounted thereover, are arranged on the support platform 12p to define a propulsion plane in which the draw-tape 22 is propelled inwardly or backwardly. In this specific and non-limiting example, the propulsion plane of the draw-tape 22 is substantially parallel to the support platform 12p, and also to the rotational motion axis 13i of the transmission unit 13. Optionally, but in some embodiments preferably, the portion of the draw-tape 22 propelled by the rotating wheels 16s,16d and the grooved band/belt 15 coupled to them is substantially parallel to the rotational motion axis 13i of the transmission unit 13.

The threading accessory 10 can also include a front support 12u protruding upwardly from a front portion of the support platform 12p. The front support 12u comprises a front guiding eyelet 18u configured to guide portions of the draw-tape 22 propelled therethrough, and the rear support 12i comprises a rear guiding eyelet 18i configured to guide portions of the draw-tape 22 propelled therethrough. Optionally, and in some embodiments preferably, the rear guiding eyelet 18*i* and the front guiding eyelet 18*u* are aligned with the circumferential groove 15*g* (i.e., located at the same height with respect to the support platform 12*p*). Such an arrangement of the rear guiding eyelet 18*i* and the front guiding eyelet 18*u* provides that in operation the portion of the draw-tape 22 passing through the propulsion unit 12 remains substantially straight/linearly aligned. This way the portion of the draw-tape 22 passing through the propulsion unit 12 is maintained substantially parallel to the support platform 12*p*, thereby significantly reducing/eliminating resisting forces acting on the draw-tape 22, and facilitating smooth movement of portions of the draw-tape 22 as it passes through the propulsion unit 12 and its guiding eyelets 18*i*,18*u*.

The rotating wheels 16*d* and 16*s* can be configured to define a belt pressing zone 16*g* in a gap formed therebetween, configured for pressing of a portion of the grooved propulsion belt 15 passing therein for elastically deforming the same to substantially wrap around/about circumference of a respective portion of the draw-tape 22 retained in the circumferential groove 15*g* of the grooved belt 15. Optionally, and in some embodiments preferably, the propulsion unit 12 comprises one or more spaced-apart rollers (also referred to herein press-wheels) 17*a*, 17*b*, . . . arranged in the belt pressing zone 16*g* oppositely to and spaced-apart from the rotating wheels 16*s* and 16*d*. In this non-limiting example two rollers 17*a* and 17*b* are placed in the belt pressing zone 16*g*, and configured to press portions of the draw-tape 22 against the grooved propulsion belt 15.

In operation, a portion of the draw-tape 22 which passes through the propulsion unit 12 (retained in the circumferential groove 15*g*) is pressed by the pair of spaced-apart rollers 17*a* and 17*b* into a portion of the circumferential groove 15*g* of the grooved propulsion belt 15, thereby firmly holding/trapping the draw-tape 22 portion therein. This way, enhanced friction and retention forces are obtained between the respective portions of the draw-tape 22 and of the circumferential groove 15*g* due to the pressure applied by the spaced-apart rollers 17*a* and 17*b* over the draw-tape 22 portion against and into the circumferential groove 15*g* of the grooved belt 15. Thus, activation of the actuator 14 in one direction (e.g., clockwise) pulls portions of the draw-tape 22 out from the thread container 11 and distally push them by the propulsion unit 12, and activation of the actuator 14 in the opposite direction (e.g., counterclockwise) proximally pulls portions of the draw-tape 22 by the propulsion unit 12 and push them to spool inside the thread container 11.

As seen in the sectional view of FIG. 4, the transmission unit 13 includes in some embodiments a gear system 13*g* configured for transferring/relaying rotary motion received from the actuator device 14 to the front driving wheel 16*d* in accordance with a selected transmission ratio of angular velocities between the rotation velocity of the actuator device 14 (input angular velocity) and the rotation velocity of the front driving wheel 16*d* (output angular velocity). In some possible embodiments, in order to provide sufficient power for actuating the front driving wheel 16*d*, such transmission ratio is set to about 1:2 (output:input).

As seen in FIGS. 2 and 4, the gear system 13*g* is mechanically couplable to the actuator device 14 via the receiving axle/shaft 13*x* for receiving rotary motion of the actuator device (14), and transferring the same to the propulsion unit 12 via the transmission shaft/axle 12*d* passing in the transmission arm 13*a*. The transmission arm 13*a* is configured for transferring/relaying rotary motion to the front driving wheel 16*d* for rotating the front driving wheel 16*d* about an axis x1 of the transmission shaft/axle 12*d*.

As also seen in FIG. 4, the rear driven wheel 16*s* is coupled to a rear rotary rod/shaft 12*s* rotatable about its axis x2 and configured for rotation of the rear driven wheel 16*s* therewith responsive to the movement of the grooved belt 15 in operation. The rear rotary rod/shaft 12*s* is connected to a bearing 12*e* which external ring is fixedly attached to a bottom part of the support platform 12*p* (e.g., by bearing housing 12*q*) and configured to enable rotation thereof about its axis x2.

As better seen in FIG. 5, the rollers 17*a* and 17*b* are connected to a support element 12*w* via respective rods/poles 12*a* and 12*b* (e.g., implemented by cam-followers), and are rotatable about axes of the respective rods/poles 12*a* and 12*b*. The rollers 17*a* and 17*b* are located underneath the support element 12*w* via their respective rods/poles 12*a* and 12*b*, so as to suspend the rollers at a certain distance from the support platform 12*p*.

The rollers 17*a* and 17*b* are configured to press (apply force) on the grooved belt 15 so as to cause elastic deformation of a portion of the grooved belt, as will be described further below with reference to FIG. 6D. Consequently, a portion of the draw-tape 22 is pressed against the grooved propulsion belt 15 and firmly trapped/maintained within the circumferential groove 15*g* due to enhanced friction forces obtained between the respective portion of the draw-tape 22 and of the circumferential groove 15*g*, and due to the pressure applied by the spaced-apart rollers 17*a* and 17*b* pressing the draw-tape portion against and into the circumferential groove 15*g* of the grooved belt 15.

In operation, as the draw-tape 22 is being pushed/pulled to pass through the propulsion unit 12, the rollers 17*a* and 17*b* interact with the portion of the draw-tape 22 retained within the circumferential groove 15*g* in the belt pressing gap 16*g*, and thereby causes responsive rotation of the rollers 17*a* and 17*b*, which facilitates smooth movement (pushing/pulling) of the draw-tape 22.

As better seen in FIG. 4, the support element 12*w* is coupled to a press-wall 12*f* located within the belt pressing gap (16*g*) defined between the wheels 16*s* and 16*d*, and spaced apart from each of them. The press-wall 12*f* is connected to a region of the support platform 12*p* located between the wheels 16*s* and 16*d*. As seen in FIG. 5, in some embodiments the press-wall 12*f* comprises a guiding groove 28 which faces/arranged oppositely to the rollers 17*a* and 17*b*. The guiding groove 28 is configured for receiving a portion of a driving rail (15*t* in FIG. 6B) formed in some embodiments on the inner side of the grooved belt 15, and for guiding the grooved belt 15 as it is passed thereinside.

The press-wall 12*f* is configured in some embodiments to exert a counter force onto the grooved belt 15. In this example, the rollers 17*a* and 17*b* press the draw-tape 22 and apply a force thereto in a radial direction against the press-wall 12*f*, thereby pressing portions of the draw-tape 22 against and into the circumferential groove 15*g* of the grooved belt 15 and compressing/deforming respective portion of the grooved belt 15 against the press-wall 12*f*, to substantially wrap it about the draw-tape 22 and maintain its trapped/retained inside the circumferential groove 15*g*.

The guiding groove 28 can be configured to facilitate the deformation of the grooved belt 15 as it is pressed by the rollers 17*a* and 17*b* against the press-wall 12*f* and presses portion of the circumferential groove 15*g*, with a corresponding portion of the draw-tape 22 contained thereinside, into the guiding groove 28. This way, the upper and lower sides of the portion of the circumferential groove 15*g* pressed into the guiding groove 28 are caused to latch over the portion of the draw-tape 22 and provide a firm grip thereover.

As shown in FIG. 5, each of the rotating wheels 16s and 16d has a retention groove/channel 23 extending about a circumference of the wheels 16s and 16d. Each retention channel 23 extends along a circumference of the respective rotatable wheel and configured for receiving the driving rail (15t in FIG. 6B) of the grooved belt 15 therein. The retention channels 23 are aligned with the guiding groove 28 of the press-wall 12f, namely located at the same height with respect to the support platform 12p and define a path of movement of the driving rail (15t in FIG. 6B) in the propulsion unit 12.

Reference is made to FIGS. 6A and 6B, schematically illustrating the grooved belt 15 according to some possible embodiments. The grooved belt 15 comprises an inner engagement side/surface 15i having a driving rail 15t radially/inwardly extending therefrom along an inner circumference of the inner engagement surface 15i. The driving rail 15t is configured for moveable coupling the grooved belt 15 to the spaced-apart wheels 16s and 16d such that the driving rail 15t is received within the retention channels 23 of the wheels 16s and 16d and retained therewithin as they are rotated about their respective axes (x2 and x1). The grooved belt 15 has a grooved outer side 15r having the circumferential groove 15g formed oppositely to the driving rail 15t and extending along a circumference of the belt 15 in the axial direction. The grooved outer side 15 has a width W e.g., in the range of 3 to 12, optionally about 3.5 millimeters, configured to receive portion of the draw-tape 22 inside a respective portion of the circumferential groove 15g thereof. A width Y of the grooved belt 15 can generally be in the range of 16 to 50 millimeters, optionally about 30 millimeters. A width E of the driving rail 15t can generally be in the range of 3 to 10 millimeters.

As shown in FIG. 6B, the grooved belt 15 has a lower belt section 15w and an upper belt section 15u connected to each other via the driving rail 15t, and having the circumferential groove 15g arranged between them. The lower belt section 15w and the upper belt section 15u have a predefined tapering defining a tapering angle θ (e.g., of about 8° to 12°, optionally about 10°) defining a relatively narrow end at the extremities of the lower and upper belt sections 15w and 15u. The reduced thickness Z of the grooved belt 15 at its extremities can generally be in the range of 3 to 6 millimeters, and the thickness A at the relatively wider portion of the lower and upper belt sections 15w and 15u (at the central region of the grooved band) can generally be in the range of 5 to 10 millimeters, optionally about 5 millimeters.

Reference is made to FIGS. 6C and 6D, showing sectional views of the propulsion units 12 respectively taken along lines K-K and J-J in FIG. 6E. FIG. 6E shows an upper view of the propulsion unit 12, and section (dashed-dotted) lines K-K and J-J of FIGS. 6C and 6D, respectively. As better seen in FIG. 6C, in some possible embodiments, each of the lower belt section 15w and the upper belt section 15u has a respective retention shoulder (step) 15s extending downwardly/upwardly a distance R (e.g., about 2 to 5 millimeters, optionally about 2 millimeters) from a respective edge of the circumferential groove 15g i.e., surfaces of the retention shoulders/steps 15s are substantially parallel to the surfaces of the inner engagement side 15i of the grooved belt 15.

The tapered portions of the grooved belt 15 extend from the respective shoulder 15s to the top and bottom extremities of the grooved belt 15. The retention shoulders 15s define/constitute a deformable region 15p of the grooved belt 15 configured for trapping/wrapping about the draw-tape 22 held within the circumferential groove 15g. More specifically, as shown in FIG. 6D, in operation, the shoulder 15s of the lower belt section 15w and of the upper belt section 15u are elastically deformed towards each other in response to a pressure/force applied to the central region of the grooved belt 15 passing in the belt pressing zone 16g, thereby at least partially closing the portion of the circumferential groove 15g in the belt pressing zone 15g and trapping/retaining the respective portion of the draw-tape 22 within the circumferential groove 15g.

In the (K-K) sectional view of FIG. 6C there is seen the rear driven wheel 16s with the grooved belt 15 wrapped thereabout and the draw-tape 22 held inside its circumferential groove 15g before entering the belt pressing zone 16g i.e., the shoulders 15s of the grooved belt 15 are not deformed. As also seen, the grooved belt 15 is coupled to the wheels 16s and 16d (only wheel 16s is shown in this figure) such that the driving rail 15t is located within their retention channels 23. Each of the wheels 16s and 16d has a diameter B e.g., generally in a range of 40 to 100 millimeters, optionally about 40 millimeters, and the retention channels 23 have a width G e.g., generally in a range of 5 to 10 millimeters, optionally about 5 millimeters.

FIG. 6D shows a cross-sectional view of the propulsion unit 12 taken along the section lines J-J i.e., within the belt pressing zone 16g. In operation, the rollers 17a and 17b (only roller 17b is shown in FIG. 6D e.g., cam-followers) engage the grooved belt 15 at its deformable region 15p and apply pressure/force over the retention shoulder 15s. The pressure/force applied by the rollers 17a and 17b causes the retention shoulders 15s to elastically deform towards each other over the portion of the draw-tape trapped between them, and to at least partially close the gap/space of the groove 15g, as the deformed portions of the grooved belt 15 are wrapped about the portion of the draw-tape 22 retained within the circumferential groove 15g.

Figure 7:
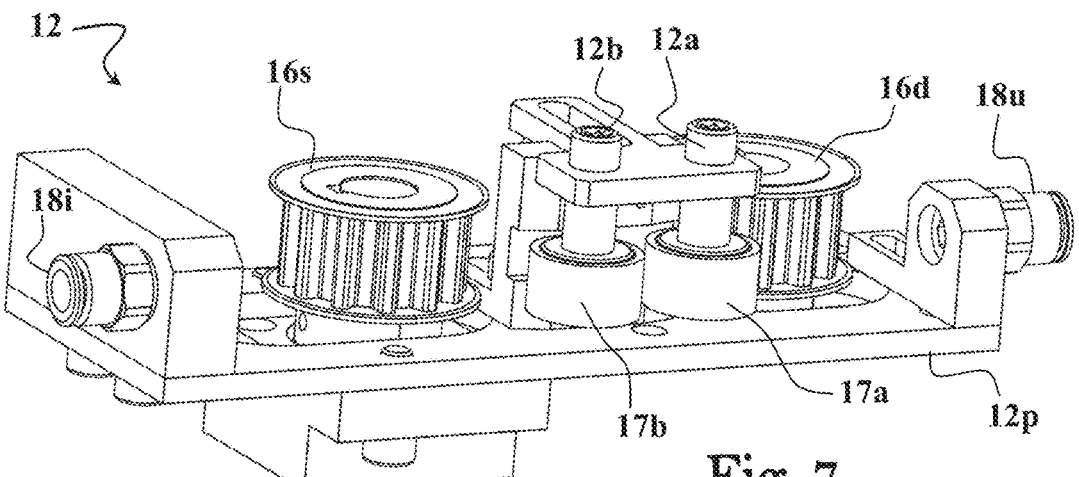
FIG. 7 schematically illustrates a configuration of the propulsion unit utilizing cogwheels according to some possible embodiments.

Reference is made to FIG. 7, illustrating a possible embodiment of the propulsion unit 12 in which the wheels 16s and 16d are configured as cogwheels. In this possible embodiment the inner engagement side 15i of the grooved belt 15 can be configured to include timing teeth (not shown) so as to form a synchronous (timing) belt configured to engage the cogwheels (16s and 16d). In possible embodiments only the driving rail 15t of the grooved belt 15 includes timing teeth (cogged inner circumference—not shown) configured to mate with respective toothed/cogged surface (15q in FIG. 6C) formed inside the circumferential channel 23 of the rotating wheels 16s,16d. In other possible embodiments both the inner engagement side 15i and the driving rail 15t of the grooved belt 15 includes timing teeth (cogged inner circumference—not shown) configured to mate with respective toothed sprockets (15q) formed on the rotating wheels 16s,16d and inside their circumferential channel 23.

Figure 8A:
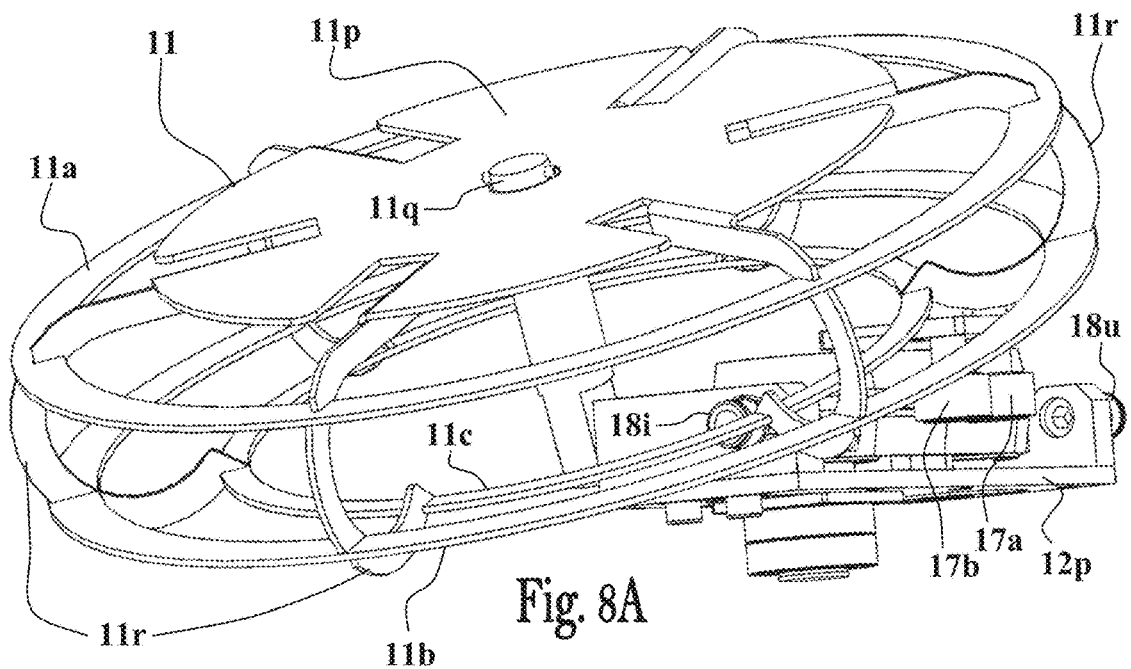
FIGS. 8A and 8B schematically illustrate, respectively, top and side views of a tiltable thread/draw-tape container according to some possible embodiments.
Figure 8B:
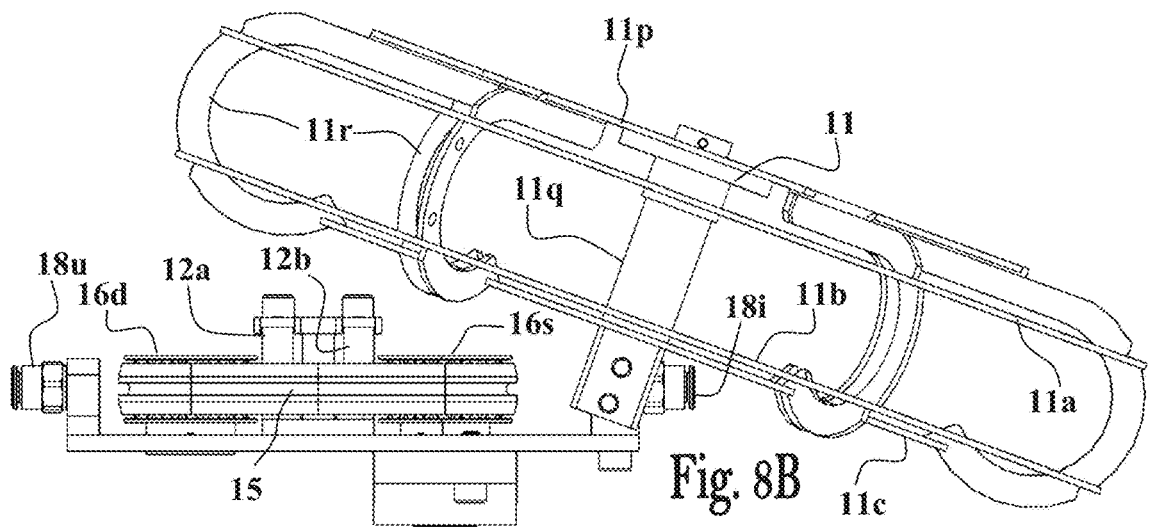

Reference is made to FIGS. 8A and 8B, illustrating, respectively, a top and side perspective views of the tiltable thread container 11 according to some possible embodiments. The tiltable thread container 11 has a closure disc 11p at its upper side connected to the axle/shaft 11q of the thread container 11. The tiltable thread container 11 also has a plurality of spaced-apart U-shaped arches/ribs 11r radially extending from the closure disc 11p and curved downwardly and inwardly to define spooling space therewithin for the draw-tape 22. The plurality of spaced-apart U-shaped arches/ribs 11r are connected one to the other by upper ring 11a and bottom ring 11b, and to an internal ring 11c connecting the free ends of the U-shaped arches/ribs 11*r* to define an annular opening through which portions of the draw-tape 22 are being propelled into/outside the thread container 11.

In possible embodiments the tilt angle thread container 11 is fixedly adjusted upon connection to the support platform 12*p* (e.g., during manufacture/assembly), or before each use by the operator, to assume a fixed angle maintained throughout its operation. Alternatively, the tilt angle of the thread container 11 can a fixed unchangeable angle.

It should be understood that throughout this disclosure, where a process or method is shown or described, the steps of the method may be performed in any order or simultaneously, unless it is clear from the context that one step depends on another being performed first. It is also noted that terms such as main, secondary first, second, . . . etc. may be used to refer to specific elements disclosed herein without limiting, but rather to distinguish between the disclosed elements. Relative terms such as "lower," "upper," "horizontal," "vertical," "above," "below," "up," "down," "top" and "bottom", as well as derivatives thereof (e.g., "horizontally," "downwardly," "upwardly," etc.), and similar adjectives in relation to orientation of the described elements/components refer to the manner in which the illustrations are positioned on the paper, not as any limitation to the orientations in which these elements/components can be used in actual applications.

As described hereinabove and shown in the associated figures, the present disclosure provides a hand-held threading accessory. While particular embodiments of the invention have been described, it will be understood, however, that the invention is not limited thereto, since modifications may be made by those skilled in the art, particularly in light of the foregoing teachings. For example, the threading accessory is not necessarily implemented as a handheld unit (i.e., it may be stationary or portable over wheels), and may include an integrally assembled actuator device. In addition, the disclosed threading accessory may be utilized the threading of any elastically deformable thread (e.g., cables, wires, pipes/conduits, or suchlike), for any suitable purpose (e.g., for opening blockages in pipes/tunnels, monitoring and/or measuring such pipes/tunnels, etc.) Accordingly, and as will be appreciated by the skilled person, the invention can be carried out in a great variety of ways, employing more than one technique from those described above, all without exceeding the scope of the claims.

The invention claimed is:

1. A handheld threading accessory comprising:
   a belt and two rotatable wheels configured to revolve said belt, said belt having a circumferential groove formed in an outer face thereof and configured to receive and hold a portion of a thread therein;
   a thread container configured to spool or unspool the thread; and
   one or more press-wheels configured to engage elastically deform a portion of said belt passing between said rotating wheels to thereby at least partially wrap said belt portion about said portion of the thread, so as to latch said thread portion in said circumferential groove, and either spool or unspool the thread when said belt is revolved by said two rotatable wheels.

2. A threading accessory comprising:
   a belt and two rotatable wheels configured to revolve said belt, said belt having a circumferential groove formed in an outer face thereof and configured to receive and hold a portion of a thread therein,
   one or more press-wheels configured to elastically deform a portion of said belt passing between said rotating wheels to thereby at least partially wrap said belt portion about said portion of the thread, so as to latch said thread portion in said circumferential groove; and
   a press-wall fixedly located between the rotating wheels facing an inner face of the belt, wherein the one or more press-wheels are configured to press the portion of the belt thereby engaged towards said press-wall for elastically deforming said belt portion.

3. The threading accessory of claim 2 wherein the press-wall comprises a horizontal groove configured to receive portions of the belt pressed by the one or more press-wheels and facilitate the elastic deformation of the belt portion and its latch over the thread.

4. The threading accessory of claim 3 wherein the one or more press-wheels are fixedly connected to the press-wall.

5. The threading accessory of claim 1 comprising at least one guiding eyelet configured to guide the thread to, or from, the thread container.

6. The threading accessory of claim 1 wherein the belt comprises a circumferential driving rail formed on an inner side thereof, and wherein the rotatable wheels comprise a retention groove configured to receive said driving rail thereinside.

7. The threading accessory of claim 6 wherein the retention groove of at least one of the rotatable wheels has a cogged inner surface.

8. The threading accessory of claim 7 wherein the circumferential driving rail of the belt comprises cogs configured to mate with the cogged inner surface of the retention groove of the at least one of the rotatable wheels.

9. The threading accessory of claim 1 wherein the belt, the rotatable wheels and the press-wheels, are arranged on one side of a support platform and a transmission unit of said threading accessory is attached to another side of said support platform.

10. The threading accessory of claim 9 wherein the transmission unit comprises a gear system configured to receive external rotary motion over an axis of rotations substantially parallel to a threading axis of said threading device, and transfer said rotary motion to at least one of the rotatable wheels.

11. The threading accessory of claim 9 comprising a handle connectable to the transmission unit.

12. The threading accessory of claim 1 wherein the belt has tapering sections extending from the circumferential groove towards the edges of said belt and configured to facilitate the deformation and latch over the thread.

13. The threading accessory of claim 1 wherein at least one of the rotatable wheels comprises cogs.

14. The threading accessory of claim 13 wherein an inner face of the belt comprises cogs configured to mate with cogs of at least one of the rotatable wheels.

15. The threading accessory of claim 9 wherein the thread container is tiltable with respect to the support plate.

16. The threading accessory of claim 15 wherein the tiltable thread container is attached to the threading accessory by an axle, and wherein said tiltable thread container is configured to rotate about said axle in opposite directions in response to the spool of the thread thereinside and to the unspool of the thread therefrom.

17. The threading accessory of claim 16 wherein the tiltable thread container is a circular container having a circular opening configured for passage of the thread therethrough.

18. A method of manipulating a thread by the threading accessory of claim 1, the method comprising:
- coupling an actuator to a transmission unit of said threading accessory;
- activating said actuator to transfer rotary motion in a first rotary direction for rotating the belt of said threading accessory;
- pressing a portion of said belt by the one or more press-wheels, thereby causing said portion of the belt to elastically deform and at least partially wrap over the thread, to thereby enhance friction/retention forces between portions of the thread and the circumferential groove of the elastically deformed belt as the thread is moved in a first axial direction.

19. The method of claim 18 comprising activating the actuator to transfer the rotary motion in a second rotary direction, being opposite to the first rotary direction, thereby causing the belt to move the thread in a second axial direction.

20. The method of claim 18
- comprising spooling or unspooling portions of the thread inside the rotatable thread container responsive to the activating of the actuator.

\* \* \* \* \*